(12) United States Patent
Daume

(10) Patent No.: US 6,910,899 B1
(45) Date of Patent: Jun. 28, 2005

(54) ELECTRICALLY CONDUCTIVE PIPE OR CABLE CLIP

(75) Inventor: Britta Daume, Burgwedel (DE)

(73) Assignee: Daume Patentbesitzgesellschaft mbH & Co. KG (DE)

( * ) Notice: Subject to any disclaimer, the term of this patent is extended or adjusted under 35 U.S.C. 154(b) by 0 days.

(21) Appl. No.: 10/312,919

(22) PCT Filed: Aug. 9, 2000

(86) PCT No.: PCT/EP00/07722

§ 371 (c)(1), (2), (4) Date: Dec. 27, 2002

(87) PCT Pub. No.: WO02/03501

PCT Pub. Date: Jan. 10, 2002

(30) Foreign Application Priority Data

Jun. 30, 2000 (DE) .......................................... 100 31 101
Jul. 14, 2000 (DE) ..................................... 200 12 363 U

(51) Int. Cl.[7] .......................... H01R 13/648; H01R 4/66
(52) U.S. Cl. ...................................................... 439/100
(58) Field of Search ................................ 439/100, 192, 439/92; 174/40 CC, 84 S, 78

(56) References Cited

U.S. PATENT DOCUMENTS 2,279,866 A * 4/1942 Ellinwood ............. 174/40 CC
2,432,492 A * 12/1947 Tinnerman ............. 174/40 CC
3,891,291 A * 6/1975 Nadsady et al. ............ 439/192
4,465,330 A * 8/1984 De Cenzo ..................... 439/92
4,659,870 A * 4/1987 Jones ........................ 174/84 S
4,910,832 A 3/1990 Schaub et al. .............. 24/20 R

FOREIGN PATENT DOCUMENTS

| | | |
|---|---|---|
| DE | 1089031 | 9/1960 |
| DE | 19841186 | 2/2000 |
| DE | 19842380 | 2/2000 |
| DE | 19922843 | 2/2000 |
| DE | 19841199 | 3/2000 |
| DE | 199 22 856 | 3/2000 |
| DE | 19943664 | 3/2000 |
| EP | 0744788 | 11/1996 |
| EP | 0982524 | 3/2000 |
| FR | 882 142 | 5/1943 |
| RU | 2068605 | 10/1996 |

* cited by examiner

*Primary Examiner*—Javaid H. Nasri
(74) *Attorney, Agent, or Firm*—Robert W. Becker & Associates; Robert W Becker

(57) ABSTRACT

A device for forming an electrically conductive contact with an electrically conductive component of an elongated body is provided. The device includes a base structure for disposition on the body to be contacted, and a separate contact element for contacting the body in a contact mounting position for producing an electrically conductive connection between the electrically conductive component and a ground cable. The contact element is formed of profiled sheet metal. The base structure is comprised of an elastic material that on the side turned toward the contact element comprises a disposition surface for the disposition of the contact element thereon over substantially the entire length of the contact element.

45 Claims, 6 Drawing Sheets

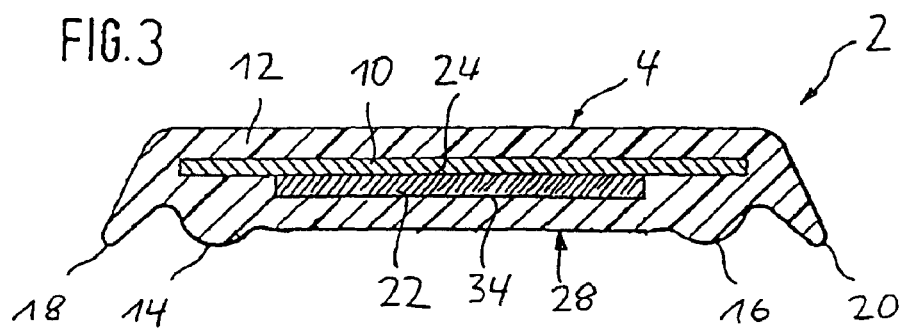
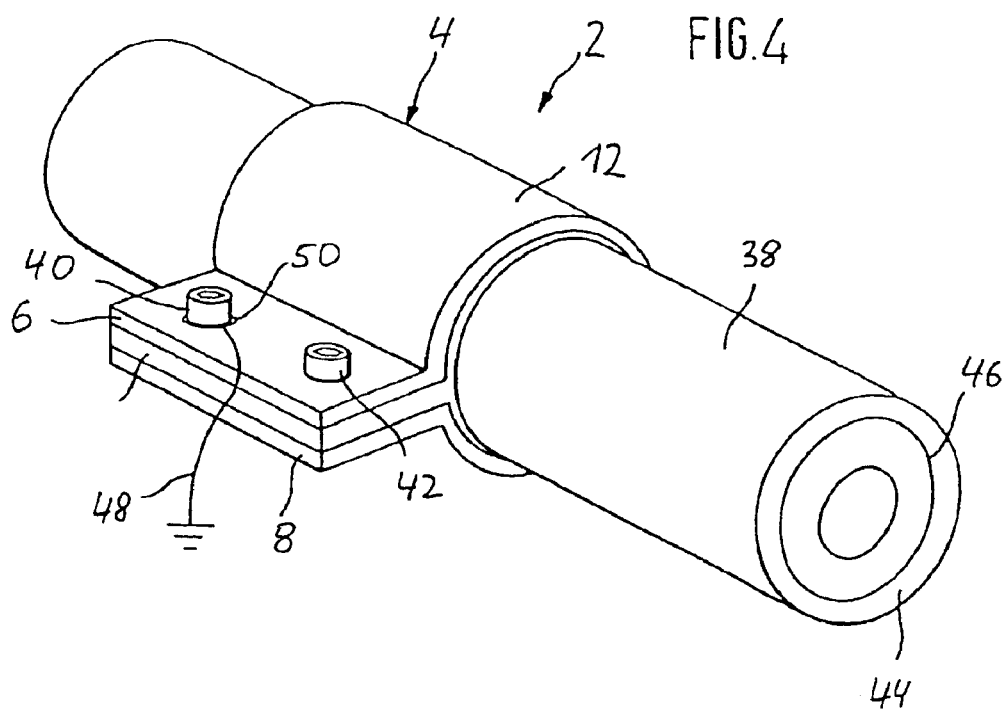

ELECTRICALLY CONDUCTIVE PIPE OR CABLE CLIP

BACKGROUND OF THE INVENTION

The invention relates to a device of the type incorporating the main principles of claim 1 for electrically conductive contact of an electrically conductive component of a body to be contacted, in particular, an elongate, for example, substantially cylindrical, body such as, for example, a pipe or a cable.

Such devices are used, for example, for connecting a metallic pipe or a stripped outer conductor of a coaxial cable to a ground cable.

EP 0 744 788 A1 discloses a device of the relevant art, which comprises a main body for disposition on the body to be contacted and a contact element for producing an electrically conductive connection with the electrically conductive component of the body to be contacted, the contact element being retained on the respective side of the main body which faces the body to be contacted in the contact mounting position. In this conventionally known device, the main body comprises a support element in the form of a hoop-type metallic collar, which is embedded in elastic material, whereby, on the respective side of the main body which faces the body to be contacted in the contact mounting position, a contact surface for the contact element is left free. The contact element is, in this conventional device, in the configuration of a hoop formed of copper mesh, which is secured on the contact surface of the main body by means of an adhesive material or spot welding.

A disadvantage of the known device is the expensive production cost of the hoop formed of copper mesh which forms the contact element. A further disadvantage is that the hoop is difficult to produce. This complicates and adds to the production expense of the device.

Moreover, a further disadvantage with respect to this conventional device is that, in connection with the securement of the hoop on the metallic collar by means of an adhesive material, the electrical contact surface between the contact element and the collar is reduced as both components are electrically insulated against one another in the region of the adhesive securement. This increases the electrical resistance between the contact element and the collar. In order to counter this increase in electrical resistance, the contact element must have a correspondingly larger surface, which further adds to the production expense of the production of the known device.

SUMMARY OF THE INVENTION

The core concept of the inventive teachings resides in the fact that, in lieu of a metallic mesh hoop, a contact element of profiled sheet metal is used. Via application of this teaching, the production of the inventive device is configured in a surprisingly simple manner and is, therefore, more cost-favorable.

The contact element can, for example, be comprised of pre-finished profiled sheet metal in the form of material of the type sold by unit length, which, to accommodate a required length of the contact element, can be produced in a simple manner as a function of the size of the inventive device.

Furthermore, the contact element formed of profiled sheet metal is especially cost-favorable. This considerably reduces the production cost of the inventive device. The contact element can be comprised of any suitable desired metallic sheet metal with sufficient electrical conductivity such as, for example, brass plate, steel plate, copper plate, or a plate formed of bronze, a plate having a copper alloy, or beryllium.

The profile of the contact element is selectable in a wide range in correspondence with the respective requirements. In furtherance of this purpose, the contact element is formed with a substantially waveshaped or meander-shaped or zig-zag-shaped profile, as is provided for in one embodiment of the device. This embodiment is simple and can be produced in a cost-favorable manner. As a result of the substantially wave-shaped, meander-shaped, or zig-zag-shaped profile, a secure mounting of the contact element on the body to be contacted is ensured even with the presence of large dimensional tolerances in the contact mounting position of the device.

A further configuration of the above-noted embodiment provides that the profile of the contact element is comprised of serially arranged wave peaks and wave valleys having shapes, in cross-section, which are round, arcuate-shaped, triangular-shaped, or trapezoidal-shaped. The shape of the wave peaks and wave valleys is, thus, selectable in a wide range in correspondence with the respective requirements.

The profile of the contact element may be non-uniform along its extent or may be only intermittently uniform. The purpose of the profiling is, however, furthered by configuring the profile to be uniform over substantially the entire length of the contact element. This facilitates the production of the contact element and effects, in the contact mounting position of the device, a uniform contact between the contact element and the body to be contacted. For example, in connection with the contact of a stripped outer conductor of an HF-cable, the circumferentially uniform profiling of the contact element prevents the occurrence of a non-uniform circumferential loading of the outer conductor in the contact mounting position of the device, which can lead to undesired reflection of an electrical signal transmitted via the cable.

An especially advantageous further embodiment of the inventive teaching provides that the contact element is, in its longitudinal direction, non-profiled on its ends or is flattened off on its ends. This facilitates the mounting of the contact element on the base structure. If the contact element retained on the base structure via, for example, receipt of the ends of the contact element in pocket-shaped receptacles of the base structure, the insertion of the truncated ends into the receptacles is facilitated and the mounting of the contact element on the base structure is thus simplified. The mounting of this embodiment of the invention can not only be manually accomplished, as is the case with conventional devices, but can be fundamentally accomplished, as well, by machine.

The material of the base structure is selectable in a wide range. In an expedient embodiment, it is provided that the base structure comprises a support element formed of metal on which the contact element is disposed, and preferably thereon maintained, in the contact mounting position of the device. In this manner, the base structure of the inventive device is robustly configured and is, moreover, simple, and thus, producible in a cost-favorable manner.

In furtherance of this purpose, the support element formed of metal is substantially band or hoop-shaped. In this connection, the base structure can be configured as bendable.

A further modification provides that the base structure is at least partially comprised of elastic material or comprises a component formed of elastic material. Via corresponding configuration of the elastic material of the base structure, the elastic material can serve insulation or sealing purposes in, for example, a contact region in which, in the contact mounting position, the contact element is disposed on the electrically conductive component of the body to be contacted, by forming a sealing structure through which a penetration of air and/or moisture into the contact area is hindered.

A further configuration of the embodiment with the support element and the elastic material provides that the support element is firmly connected with the elastic material of the base structure or is at least partially coated with the elastic material, especially on the side thereof turned away, in the contact mounting position, from the body to be contacted, or is embedded in the elastic material of the base structure, whereby a side of the support element turned toward, in the contact mounting position, the body to be contacted, is left free as a contact surface for the contact element. In this manner, an electrically conductive connection between the support element and the contact element is produced. In the contact mounting position, an electrically conductive connection between the electrically conductive component of the body to be contacted and the support element is thus formed so that, for example, a ground cable can be connected to the support element in order to ground a metallic pipe or a stripped outer conductor of a coaxial cable.

The profile of the contact element is selectable in a wide range. An advantageous configuration thereof provides, via the profiling of the contact element along a first direction thereof, preferably, along its longitudinal direction, serially arranged projections by which, in the contact mounting position of the device, the contact element is disposed on the electrically conductive component of the body to be contacted such that an electrically conductive connection is produced between the electrically conductive component of the body to be contacted and the support element of the base structure. This embodiment is simple and can be produced in a cost-favorable manner. A secure electrical connection to the body to be contacted is produced via the projections.

An especially advantageous modification of the above-noted embodiment provides that the projections are configured as tongue-like projections and, in the contact mounting position of the device, extend outwardly toward the body to be contacted. A particular advantage of this embodiment is that the tongues can be elastically deformable and, in the contact mounting position, are disposed in an elastically resiliently biased manner on the body to be contacted. As a result of this elastically resiliently biased disposition, a continuous electrical contact, in the contact mounting position, with the body to be contacted is ensured even with the presence of large dimensional tolerances or material fatigue.

In connection with the above-noted embodiment, the tongue-like projections are, in furtherance of the noted advantageous purposes, integrally formed from and with the sheet metal of the contact element.

The configuration of the tongue-like projections can be effected in any desired suitable manner. One embodiment provides that the tongue-like projections are recessed, stamped out, or etched out of the sheet metal of the contact element. This makes possible an especially simple construction of the tongues from the contact element.

The shape of the tongue-like projections is selectable in a wide range. One embodiment provides that the tongue-like projections are, as viewed in plan view, substantially triangular-shaped or trapezoidal-shaped.

Another further configuration of the embodiment with tongue-like projections provides that the projections serially arranged in a first direction extend in an alternating manner out of the region of the opposed edges of the contact element toward the respective other edge. In this manner, the contact element is, in the contact mounting position, uniformly loaded on its opposed edges and pressed against the support element.

The tongue-like projections can, for example, extend at an angle to the first direction. The tongue-like projections extend, in furtherance of this purpose, in a second direction, which is substantially perpendicular to the first direction, as viewed in plan view.

Another further modification of the embodiment with the projections provides that, in the contact mounting position of the device, the contact element is disposed on the body to be contacted and on the support element with its projections in contact therewith, preferably in an alternating manner. Also, in this embodiment, a particularly secure conducting connection is produced via the projections between the body to be contacted and the support element, which itself can be connected with, for example, a ground cable.

The contact element can fundamentally be configured as substantially rigid. A further configuration provides, however, that the configuration of the contact element, or at least the projections thereof, be elastically deformable so as to have the respective elastically deformable contact element or the projections thereof disposed, in the contact mounting position, in an elastically resiliently biased manner on the electrically conductive component of the body to be contacted. In this embodiment, due to the electrically resiliently biased disposition of the respective elastically deformable contact element, or the projections thereof, on the electrically conductive component, an especially secure electrically conductive connection is achieved. Moreover, dimensional tolerances of the inventive device and/or the body to be contacted can be compensated by this resiliently biased disposition of the respective elastically deformable contact element or the projections thereof without necessitating further compensatory measures. In correspondence with the respective requirements, the contact element can be firmly connected with the base structure via, for example, adhesion means or welding.

The contact element can, however, also be releasably connected with the base structure, as is provided for in another embodiment. This facilitates the mounting and as the occasion arises, the dismounting, of the contact element on or, respectively, from, the base structure.

An especially advantageous further configuration of the embodiment with elastic material and the releasable connection between the base structure and the contact element provides retaining means formed on the elastic material of the base structure, which extends over the contact element in a substantially form-fitting manner at at least two opposed areas of the edges on its respective side turned away from the base structure and consequently retains the contact element on the base structure. In this embodiment, separate retaining means in, for example, the form of adhesive means, a welding connection, or a clamping component, are basically no longer required, so that the construction of the inventive device is simplified and its production can be configured in a more cost-favorable manner. In the event that an additional securement of the contact element via, for example, an adhesive material, is desired, this additional securement can comprise a reduced surface as compared to that of conventional devices.

A further configuration of the above-noted embodiment provides that the retaining means comprises at least one retaining component formed from the elastic material of the base structure, which extends from an edge of the contact element to an opposed edge of the contact element such that the retaining component extends over the contact element on the respective side thereof turned away from the base structure and consequently retains the contact element on the base structure. In this embodiment, the retaining component extends over the entire extent of the contact element between its opposed edges so that the contact element is retained in a secure manner on the base structure.

A particularly advantageous further configuration of the embodiment with the retaining component provides that the retaining component is formed of a substantially pocket-shaped receptacle for receiving therein the contact element. In this embodiment, the contact element is pushed into the pocket-shaped receptacle to effect securement of the contact element to the base structure and the embodiment thus allows for a simpler and faster securement of the contact element on the base structure.

In the above-noted embodiment, the retaining component can comprise a recess which forms the pocket-shaped receptacle. The pocket-shaped receptacle can, however, also be configured between the respective surfaces of the retaining component and the base structure which are turned toward one another, as is provided for in another embodiment.

In the embodiments with the pocket-shaped receptacles, it is basically sufficient if a single pocket-shaped receptacle is provided. A particularly advantageous further configuration provides, however, that the retaining means is comprised of two spaced retaining components which together comprise pocket-shaped receptacles turned toward one another for the receipt therein of the opposed ends of the contact element. In this configuration, each opposed end of the contact element is received in a respective one of the pocket-shaped receptacles so that the contact element is retained in a particularly secure manner on the base structure.

A further modification of the embodiment with the receptacle provides that the receptacle is substantially complementarily formed with respect to the respective end of the contact element to be received therein. In this manner, the contact element is secured via close fitting and, therefore, firm, receipt of its end or ends in the respective receptacle or receptacles.

Another further configuration which effectuates the contact element securement goal provides that the retaining means comprises at least one step on which the contact element is disposed, the step being formed from the elastic material of the base structure and being remote from the pocket-shaped receptacle or the pocket-shaped receptacles. Via the step or the steps, an additional securement of the contact element to the base structure is achieved and/or an adjustment of the contact element relative to the base structure is possible.

It is especially advantageous if at least two steps are provided on which the contact element is disposed with the opposed areas of its edges in contact therewith. In this embodiment, the contact element is held between the steps and is consequently secured against movement in the direction of the steps.

The shape and size of the contact element is selectable in a wide range. If the inventive device serves in the electrical contact formation with an elongate, for example, substantially cylindrical, body, the contact element is, in furtherance of this purpose, configured in an elongate form such that the contact element then extends, in the contact mounting position, in the circumferential direction of the body to be contacted.

In the embodiment with the elongate contact element and the pocket-shaped receptacles, the contact element is consequently secured while in a longitudinal orientation with its ends received in the pocket-shaped receptacles, as is provided for in a further configuration.

In connection with electrical contact formation with a cylindrical object such as, for example, a cable, the contact element is thus fixedly secured in the circumferential direction via the receipt of its ends in the pocket-shaped receptacles.

In the event, for example, of electrical contact formation with a cable, in which it is required that the contact element be secured to the cable not only in the circumferential direction but, as well, in the axial direction, this requirement can be met, in connection with the embodiment with the step or steps, if the contact element is secured via disposition of the longitudinal edge or both longitudinal edges of the contact element on the respective step or steps.

The base structure can be fundamentally configured as substantially rigid. As needed or desired, however, the base structure can be configured as bendable. This facilitates the mounting of the inventive device on the body to be contacted, especially, for example, on a pipe or a cable.

The shape and size of the base structure can be selected from a wide range of selections. For contact forming arrangement with a plate-shaped body, the base structure can be, for example, plate-shaped and, for contact forming arrangement with an arcuate or curved body, the base structure can be respectively arcuate or curved.

A further modification of an embodiment which is particularly advantageous for contact forming arrangement with pipes or cables of various cross-sections provides a configuration of the base structure such that, in the contact mounting position, the base structure encircles the body in a ring-shaped or sleeve-like manner. In this embodiment, the base structure encircles the body to be contacted and is consequently securely mounted thereon.

The base structure can be comprised of multiple components. In a device for contact forming arrangement with a pipe, the base structure can, for example, be comprised of several components serially arranged in the circumferential direction of the pipe to be contacted such as, for example, two half-ring-shaped components. In furtherance of such a contact forming arrangement, however, the base structure is configured as a single piece and is open in its circumferential direction and comprises, on its free ends, angled out or bent out interconnecting plates which, in the contact mounting position, are connectable to one another preferably by means of a screw fastening device or a clamping device. In this embodiment, as a result of the configuration of the base structure as a single unit, the mounting of the inventive device on the body to be contacted is especially simple.

A further modification provides that the base structure is configured as a collar to be disposed in encircling relationship around the body to be contacted. This further facilitates the mounting.

Furthermore, a further configuration of the embodiment with the support element and the elastic material provides that the metal component comprises at least one passage, and preferably at least one passage on each side of the contact element, through which the elastic material extends in a manner such that the elastic material on the respective side of the metal component turned toward the contact element is connected with the elastic material on the respective side of the metal component turned away from the contact element. In this manner, the embodiment, which provides releasable securement of the contact element with the base structure, prevents a lifting off of the contact element from the support element.

In order to prevent a penetration of air and/or moisture into the region of the contact forming arrangement, a further configuration provides that the device is configured with sealing means for sealing off a space formed in the contact mounting position between the body to be contacted and the base structure against a penetration of air and/or moisture thereinto.

An advantageous further modification of the embodiment with the sealing means provides that the sealing means comprises sealing lips formed of elastic material which are disposed on the respective side of the base structure which faces the body to be contacted in the contact mounting position and which are spaced from one another transversely to the longitudinal direction of the base structure or, respectively, in the axial direction of the base structure, the sealing lips extending along, preferably, the entire length of the base structure in its longitudinal direction or, respectively, in its circumferential direction, and being disposed, in the contact mounting position of the device, in a seal effecting manner on the body to be contacted. This embodiment is simple in its configuration and makes possible a sealing off of the contact area in a reliable manner.

In the embodiment with the retaining means and the sealing lips, the retaining means is purposely formed on the sealing lips, which simplifies the production.

Another further modification provides that the base structure is substantially completely formed of elastic material. In this embodiment, a separate support element is no longer required so that the construction of the inventive device is further simplified. It is also possible that the contact element itself forms the support element.

According to another embodiment, the contact element can be firmly connected with the elastic material of the base structure.

Another exceptionally advantageous further modification of the embodiment with the elastic material provides that the elastic material of the base structure on the side thereof turned toward the contact element comprises a disposition surface for the disposition of the contact element thereon which is substantially complementarily formed with respect to the contact element such that the contact element is disposed over substantially its entire length on the elastic material of the base structure. In this manner, in the contact mounting position of the device, an especially secure disposition of the contact element on the electrically conductive component of the body to be contacted is achieved. The elastic material of the base structure, furthermore, provides for an elastically resiliently biased disposition of the contact element on the electrically conductive component of the body to be contacted.

In connection with the above-noted embodiment, the contact element can be interconnected in any desired suitable manner with the elastic material of the base structure. For example, the portion of the elastic material with which the contact element is connected can be comprised of an extruded band material. An advantageous further modification provides, however, that the contact element is sprayed with the elastic material of the base structure. This embodiment is simple and can be produced in a cost-favorable manner. Moreover, this embodiment ensures that the disposition surface of the base structure is complementarily formed with respect to the profile of the contact element.

A further modification of the embodiment with the single unit base structure and the interconnecting plates provides that the contact element extends to the interconnecting plates. In this embodiment, a ground cable, for example, can be electrically connected with the interconnecting plates so that there is produced, via the contact element, an electrically conductive connection between the ground cable and the electrically conductive component of the body to be contacted such as, for example, a stripped outer conductor of a coaxial cable.

Another further configuration of the inventive teaching provides that the elastic material of the base structure and/or of the sealing lips is formed of an elastomer, especially, vulcanized rubber and/or a thermoplastic elastomer.

The invention is described hereinafter in further detail with reference to the drawings in which an embodiment is illustrated.

DESCRIPTION OF PREFERRED EMBODIMENTS

Figure 1:
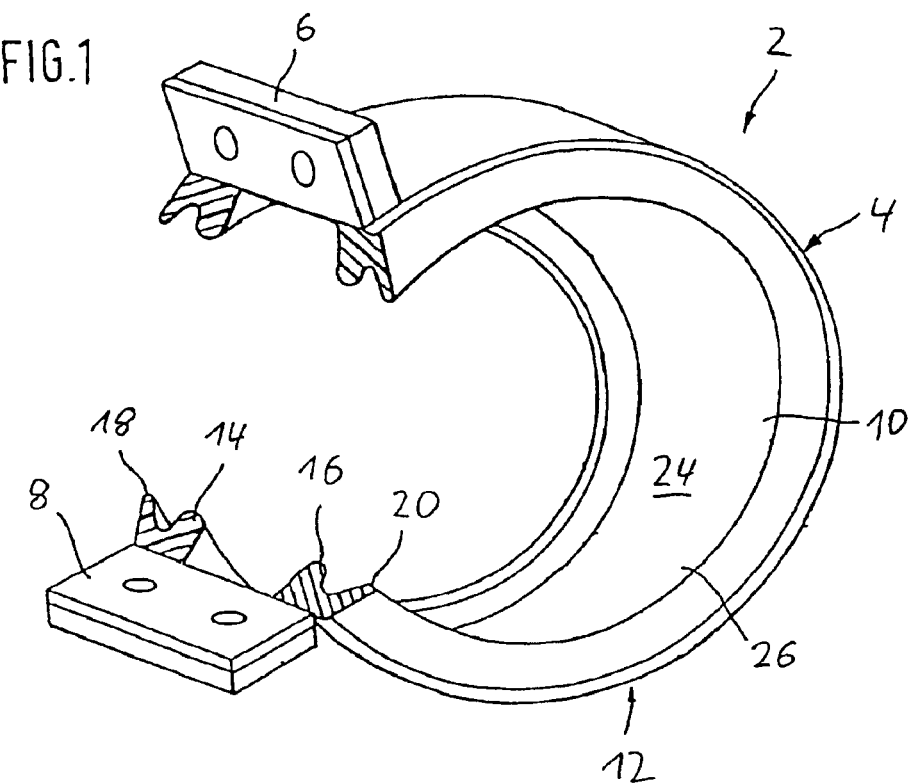
FIG. 1 a schematic perspective view of one embodiment in the form of a collar without the contact element, FIG. 2 a schematic view on the radial inner surface of the device shown in FIG. 1 with the contact element, FIG. 3 a sectional view along line III—III of FIG. 2, FIG. 4 a schematic perspective view of the device shown in FIG. 1 in the contact mounting position, FIG. 5 a decidedly schematic view of a radial section through the device in the assembled position, FIGS. 6–8 decidedly schematic views of the crosssections of the contact elements of various embodiments, FIG. 9 a view identical to that of FIG. 5 of a second embodiment of an inventive device, FIG. 10 a decidedly schematic plan view of a contact element formed of profiled sheet metal of a further embodiment, FIG. 11 a side elevational view of the smaller side of the contact element of the further embodiment shown in FIG. 10, and FIG. 12 a decidedly schematic axial sectional view through a third embodiment of an inventive device in the contact mounting position, with the device configured with a contact element in accordance with that shown in FIG. 10.

As seen in FIG. 1, a first embodiment of the device 2 of the present invention is illustrated which comprises a base structure 4 formed as a bendable collar, which, in this embodiment, is formed as a single piece and is configured to be open in the circumferential direction and comprises, on its free ends, outwardly angled interconnecting plates, 6, 8, which are connectable to one another in the contact mounting position in a manner described in more detail with respect to FIG. 4.

The base structure 4 includes a support element 10 formed of metal as well as a component 12 formed of elastic material, which in the embodiment, is comprised of an elastomer such as, for example, vulcanized rubber or a thermoplastic elastomer. The support element 10 is embedded, via its axial edges, in the component 12 formed of elastic material and is thereby firmly connected therewith (compare FIG. 3).

The component 12 formed of elastic material forms, on the side of the base structure 4 turned toward the body to be contacted in the contact mounting position, sealing lips 14, 16 projecting radiantly inwardly as well as further sealing lips 18, 20 disposed outwardly of the sealing lips 14, 16 in the axial direction. In the contact mounting position, the base structure 4 is disposed, in a manner described hereafter in more detail with respect to FIG. 4, with the sealing lips 14, 16 as well as the further sealing lips 18, 20 in a sealing manner on an outer surface of the body to be contacted, so that a space formed between the body to be contacted and the base structure 4 in the contact mounting position is sealed off against the penetration of air and/or moisture.

Figure 2:
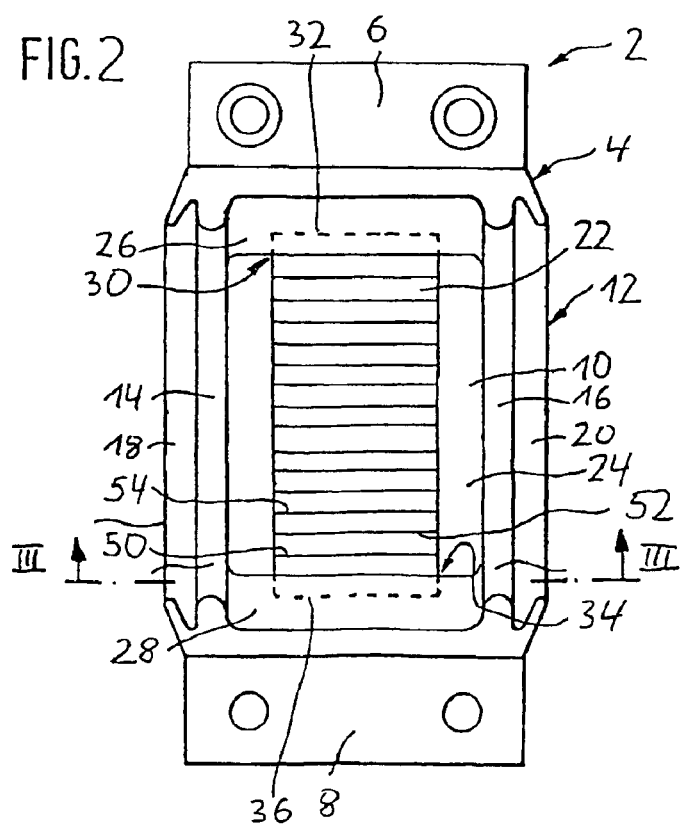

In FIG. 2, the device 2 is shown with a contact element 22, which, in accordance with the present invention, is comprised of profiled sheet metal and is retained on the radial inner surfaces 24 of the support element 10 on the base structure 4. The contact element 22 is, in this embodiment, formed of a substantially wave-shaped or, respectively, meander-shaped profile, which is described in more detail hereafter with respect to FIG. 5.

Retaining means is provided for retaining the contact element 22 on the radial inner surface 24 of the support element 10, with the retaining means including, in this embodiment, retaining components 26, 28, which are comprised of the same elastic material as the sealing lips 14–20 and the component 12 and which are formed inwardly of the sealing lips 14, 16 in the axial direction of the base structure 4.

The retaining component 26 is, in this embodiment, configured as flat strips formed of elastomer, whereby a pocket-shaped receptacle 30 is formed between the surfaces of the retaining component 26 and the support element 10 of the base structure 4 facing one another, the receptacle 30 for receiving a free end 32 of the contact element 22 therein. In a corresponding manner, the retaining component 28 is formed of a flat strip, whereby a pocket-formed receptacle 34 is formed between the surfaces of the retaining component 28 and the support element 10 of the base structure 4 facing one another for receipt therein of one of the free ends 32 of the opposed free ends 36 of the contact element 22. In the contact mounting position, the contact element 22 is received in a close fitting manner, via its ends 32, 36, in the pocket-shaped receptacles 30, 34 and is consequently retained on the base structure 4.

To effect the securement of the contact element 22 on the base structure 4, initially, the end 32 of the contact element, as shown in FIG. 1, is pushed upwardly into the pocket-shaped receptacle 30. Thereafter, the opposed end 36 of the contact element 22 is pushed, in a manner producing elastic deformation thereof, downwardly into the pocket-shaped receptacle 34, as shown in FIG. 1.

As seen in FIG. 3, which is a sectional view along a line III—III in FIG. 2, the pocket-shaped receptacle 34 is substantially complementarily configured with respect to the free end 36 of the contact element 22.

FIG. 4 shows the device 2 in the contact mounting position in which the base structure 4 encircles, in a sleeve-like manner, the body to be contacted which, in this embodiment, is a coaxial cable.

Prior to the securement of the inventive device 2 on the coaxial cable 38, initially, the outer conductor 46 of the coaxial cable, which forms the electrically conductive portion of the coaxial cable 38 to be contacted, is disposed in stripped condition via removal of the sheathing 44 in the region in which the contact mounting position of the contact element 22 is located.

To effect the securement of the device 2 on the coaxial cable 38, the base structure 4, which is configured as a collar, is disposed in an encircling relationship around the coaxial cable 38 which is to be contacted and secured by means of screws 40, 42, which extend through the through bores formed in the interconnecting plate 6 and are threadably received in threaded bores formed in the interconnecting plate 8.

The disposition of the base structure 4 in its cable encircling relationship brings about the disposition of the sealing lips 14, 16, and the further sealing lips 18, 20, which are spaced from the contact element 22, in a sealing manner around the sheathing 44 of the coaxial cable 38, so that the sealing lips seal off the space formed in the contact mounting position between the coaxial cable 38 and the base structure 4 against the penetration thereinto of air and/or moisture.

The disposition of the base structure 4 in its cable encircling relationship further brings about the disposition of the contact element 22, with attendant elastic deformation thereof, on the previously stripped outer conductor 46 of the coaxial cable 38 on the one side and on the radial inner surface 26 of the support element 10 of the base structure 4 on the other side. In this manner, an electrically conductive connection via the contact element 22 is produced between the outer conductor 46 and the support element 10 of the base structure 4. Due to the extension of the support element 10 to each of the interconnecting plates 6, 8, an electrically connecting connection is produced through the screws 40, 42 to a conductor such as, for example, a ground cable 48. In this connection, the ground cable 48 can be connected via a connection with one of the screws 40, 42.

Thus, an electrically connective connection between the ground cable 48 and the outer connector 46 of the coaxial cable 38 is produced in the desired manner so that the outer conductor 46 is grounded.

Figure 5:
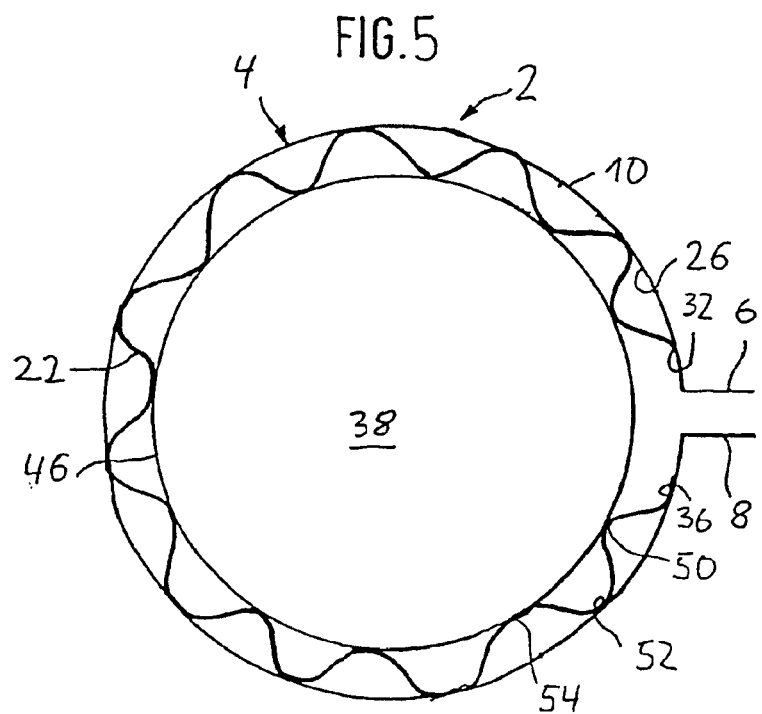

FIG. 5 shows in a decidedly schematic manner a radial sectional view through the device 2 in the contact mounting position and, in fact, a view in the axial direction into an area in which the contact element 22 is disposed on the outer conductor 46. It can be seen in this figure that the contact element 22 is substantially meander-shaped or, respectively, wave-shaped, in profile. Via the profile of the sheet metal of which the contact element 22 is comprised, serially arranged projections in the form of wave peaks and wave valleys having arcuate cross sections are formed, of which solely three projections with the reference numerals 50, 52, and 54 can be seen in FIG. 5. The serially arranged projections 50, 52, 54 effect the disposition of the contact element 22 in an alternating manner on the stripped outer conductor 46 of the coaxial cable 38 and the radial inner surface 26 of the support element 10 of the base structure 4. In this manner, a secure electrically conductive connection between the outer conductor 46 and the support element 10 and, thus, a secure electrically conductive connection as well with the grounding cable 48, via the interconnecting plate 6, 8, is produced.

The contact element 22 is comprised, in this embodiment, of thin metal plate and is thus elastically deformable so that the contact element 22 in the contact mounting position of the device 2 is disposed in an elastically resiliently biased manner on the outer conductor 46 and the radial inner surface 26 of the band-shaped metal component 10.

As can be seen in FIG. 5, the contact element 22 in this embodiment is substantially uniformly profiled in its longitudinal direction—namely, in the circumferential direction of the base structure 4. This circumferentially uniform profiling of the contact element prevents, in the contact mounting position of the device 2, the occurrence of a non-uniform circumferential loading of the outer conductor 46 of the coaxial cable 38 which, with respect to an HF-cable, can lead to undesired reflection of an electrical signal transmitted via the cable. In this connection, the loading of the outer conductor 46 in the circumferential direction is more uniform the greater the reduction in circumferential distance of the wave peaks of the profile of the contact element 22.

The contact element 22 formed of profiled sheet metal is simple and producible in a-cost-favorable manner as well as easily configurable. In this manner, the manufacture of the inventive device 2 is simple and, thus, is configured in a cost-favorable manner.

The profile of the contact element 22 can be selected from a wide range of selections. The FIGS. 6–8 show examples of various profiles, whereby, in FIGS. 6 and 7, the profile of the contact element 22 is substantially meander-shaped in cross section and, in FIG. 8, is substantially zig-zag-shaped.

Figure 6:
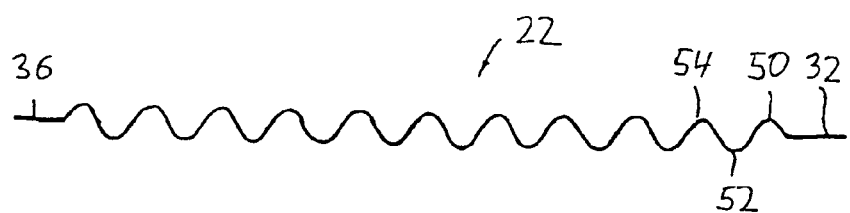
Figure 7:
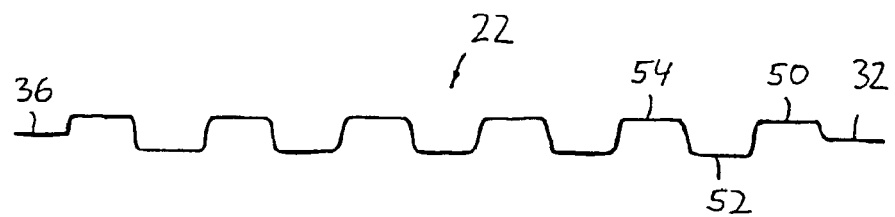
Figure 8:
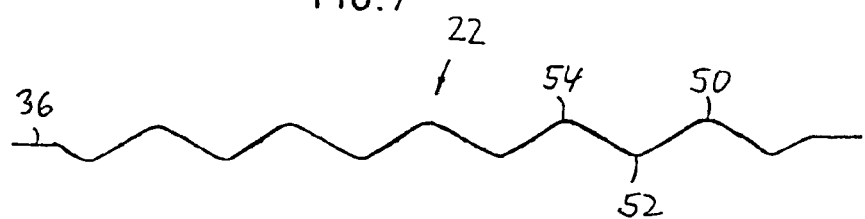

In FIGS. 6–8, it is shown that the ends 32, 36 of the contact element 22 are non-profiled in order to facilitate the disposition of the ends 32, 36 in the pocket-shaped receptacles 30, 32. In the event that the contact element 22 is comprised, for example, of a continuously profiled material of the type sold by unit length, the ends 32, 36 of the contact element 22 can be truncated after its configuration.

Figure 9:
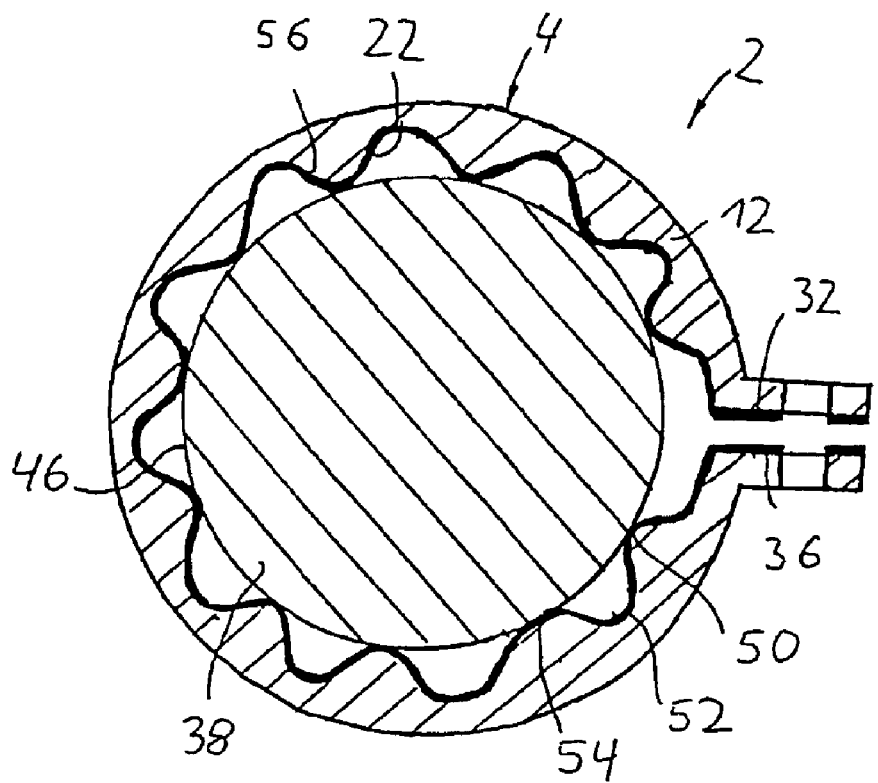

FIG. 9 shows a second embodiment of the inventive device 2 whose principal difference relative to the embodiment shown in FIG. 1 is that the base structure 4 is formed completely of an elastic material. The base structure 4 comprises a disposition surface 56 on the side of the base structure facing toward the contact element 22 which is substantially complementarily configured with respect to the profile of the contact element 22 such that, as can be seen in FIG. 9, the contact element 22 is, in the circumferential direction, disposed over substantially its entire length on the disposition surface 56. The contact element 22 is coated with the elastic material of the base structure 4 in the circumferential direction and is thus firmly connected with the elastic material.

As can be further seen in FIG. 9, the contact element 22 extends fully to each of the interconnecting plates 6, 8. In this connection, through bores are formed in the end 32 of the contact element 22 and threaded bores are formed in the end 36 of the contact element which, to effect the encircling installation of the base structure 4 in the contact mounting position shown in FIG. 9, are threadably engaged by non-illustrated screws formed of metal, as such has been illustrated with respect to the embodiment shown in FIGS. 1–4. Via the screws formed of metal, an electrical conductive connection between a ground cable, which is not illustrated in FIG. 9, and the contact element 22 and, thus, the outer conductor 46 to be contacted, is produced.

In FIGS. 6–8, it is shown that the ends 32, 36 of the contact element 22 are non-profiled in order to facilitate the disposition of the ends 32, 36 in the pocket-shaped receptacles 30, 34. In the event that the contact element 22 is comprised, for example, of a continuously profiled material of the type sold by unit length, the ends 32, 36 of the contact element 22 can be truncated after its configuration.

Figure 10:
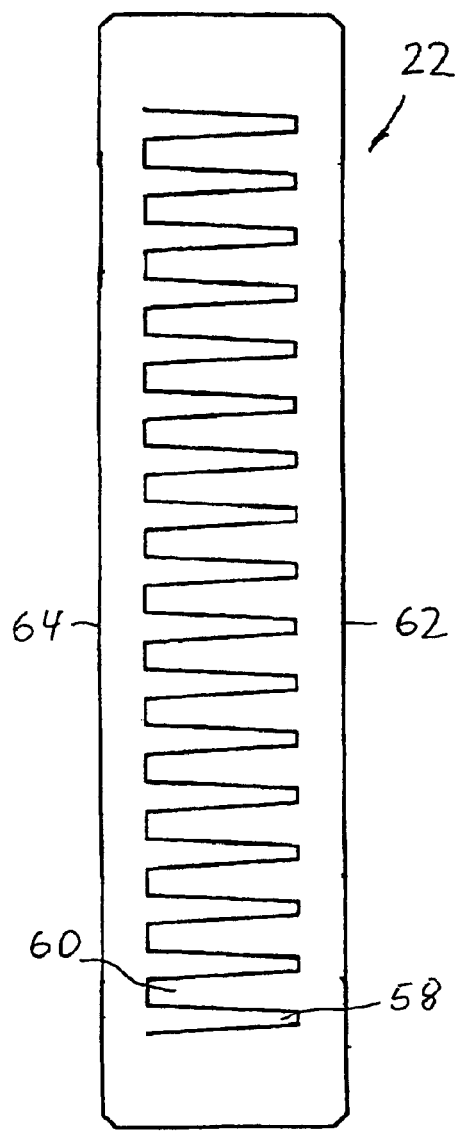

FIG. 10 shows a further embodiment of an inventive contact element 22 formed of profiled sheet metal, in which the profile of the sheet metal is formed of tongue-like projections extending in a serial manner relative to one another along the longitudinal direction of the contact element 22, of which solely two projections designated with the reference numerals 58, 60 are shown in FIG. 10. The tongue-like projections 58, 60 are integrally formed with the sheet metal of the contact element 22 and, in this embodiment, are stamped out of the sheet metal.

As can be seen in FIG. 10, the tongue-like projections 58, 60 are substantially trapezoidal in cross section. The projections 58, 60 extend, in the longitudinal direction of the contact element 22, in an alternating manner out of the region of the opposed edges of the contact element toward the respective other edge 64 or 62 thereof and, in fact, extend substantially transverse to the longitudinal direction of the contact element 22.

Figure 11:
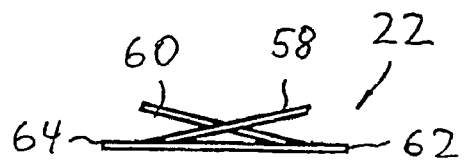

FIG. 11 shows a side view of the smaller side of the contact element 22 shown in FIG. 10.

Figure 12:
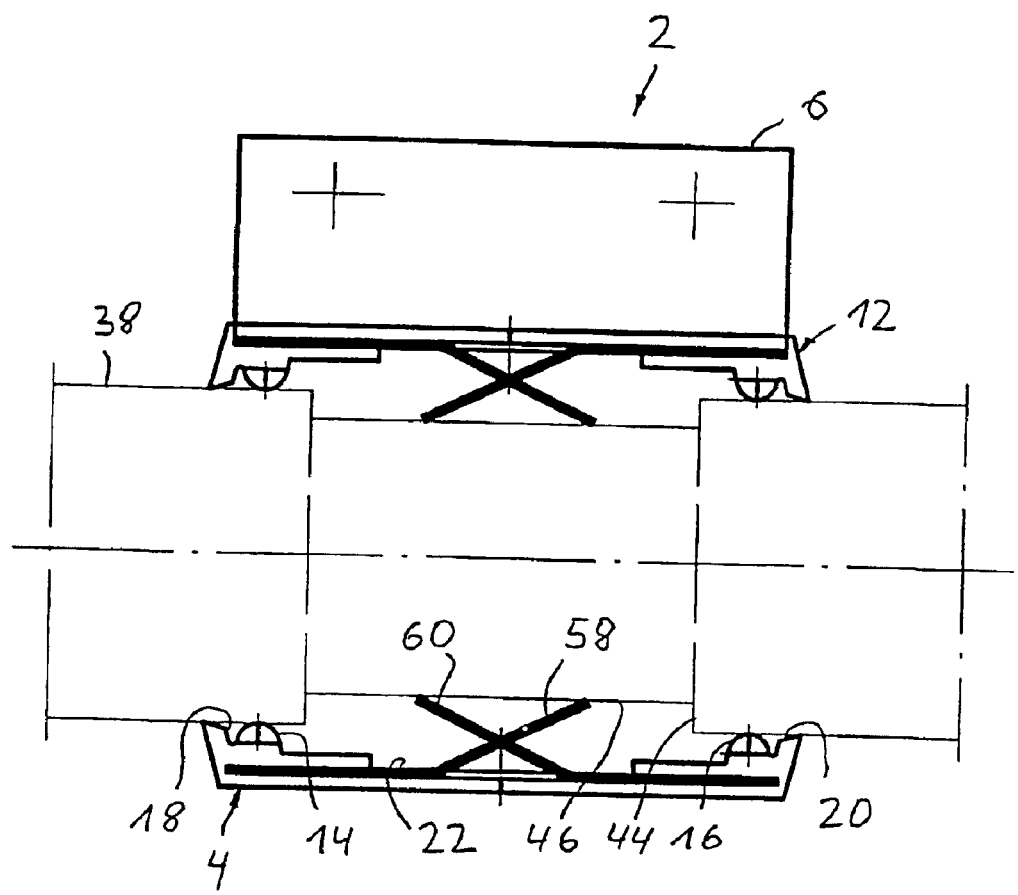

FIG. 12 shows, in a decidedly schematic view, an axial sectional view through the device 2 provided with the contact element 22 in accordance with FIG. 10 in which it can be seen that the tongue-like projections 58, 60 extend toward and are disposed on the body to be contacted, which is, in this instance as shown in FIG. 12, the stripped outer conductor 46 of the coaxial cable 38, so that an electrically conductive connection is produced between the outer conductor 46 and the contact element 22 and thus, with the ground cable, which is not shown in FIG. 12, that is connected with the interconnecting plate 6. The outer conductor 46 is thus grounded in the desired manner.

The projections 58, 60 are configured to be elastically deformable so that, in the contact mounting position of the device 2, the projections are elastically resiliently biased against the outer conductor 46. In this manner, a reliable electrical contact to the outer conductor 46 is ensured even with the presence of large dimensional tolerances or material fatigue which occurs in the course of time.

The specification incorporates by reference the disclosure of German priority documents 100 31 101.6 filed 30 Jun. 2000 and 200 12 363.7 filed 09 Aug. 2000, as well as International priority document PCT/EP00/07722 filed 9 Aug. 2000.

The present invention is, of course, in no way restricted to the specific disclosure of the specification and drawings, but also encompasses any modifications within the scope of the appended claims.

What is claimed is:

1. A device for forming an electrically conductive contact with an electrically conductive component of an elongated body, the device comprising:

a base structure for disposition on the body to be contacted; and a contact element, in the form of a separate component for contacting the body to be contacted in a contact mounting position for producing an electrically conductive connection between the electrically conductive component of the body to be contacted and a ground cable, the contact element being formed of profiled sheet metal, wherein the base structure is comprised substantially completely of an elastic material, and wherein the elastic material of the base structure, on a side thereof facing toward the contact element, has a disposition surface for the disposition of the contact element thereon, said disposition surface having a substantially complementary shape with respect to the cross-section of the contact element such that the contact element is disposed against the elastic material of the base structure over substantially the entire length of the contact element.

2. A device according to claim 1, wherein the contact element is profiled with a substantially wave-shaped or meander-shaped or zig-zag-shaped profile.

3. A device according to claim 2, wherein the profile of the contact element is comprised of serially arranged wave peaks and wave valleys having shapes, in cross-section, which are round, arcuate shaped, triangular-shaped, or trapezoidal-shaped.

4. A device according to claim 1, wherein the profile of the contact element is substantially uniform over the entire length of the contact element.

5. A device according to claim 1, wherein the contact element is configured in the longitudinal direction, at its ends, in an unprofiled manner or is truncated at these ends.

6. A device according to claim 1, wherein the base structure comprises a support element formed of metal on which the contact element is disposed, and preferably thereon maintained, in the contact mounting position of the device.

7. A device according to claim 6, wherein the support element is substantially band-shaped.

8. A device according to claim 6, wherein the base structure is comprised at least in part of elastic material or a component of elastic material.

9. A device according to claim 6, wherein the support element is firmly connected with the component formed of elastic material or the support element is coated at least partially with the elastic material of the base structure, in particular, on its side turned away from the body to be contacted in the contact mounting position or is embedded in the elastic material of the base structure, whereby a side of the support element facing the body to be contacted in the contact mounting position is left free as a contact surface for the contact element.

10. A device according to claim 6, wherein the profiling of the contact element in a first direction of the contact element, forms serially arranged projections, the contact element, in the contact mounting position of the device, being in contact with the electrically conductive component of the body to be contacted via the projections such that an electrically conductive connection is produced between the electrically conductive component of the body to be contacted and the support element of the base structure.

11. A device according to claim 10, wherein the projections are configured in tongue-shaped configurations and, in the contact mounting position of the device, extend toward the body to be contacted.

12. A device according to claim 10, wherein the tongue-shaped projections are integrally formed with the sheet metal of the contact element.

13. A device according to claim 10, wherein the tongue-shaped projections are formed out of the sheet metal of the contact element via cutting, stamping out, or etching.

14. A device according to claim 10, wherein the tongue-shaped projections are substantially triangular-shaped or trapezoidal-shaped, as viewed in plan view.

15. A device according to claim 10, wherein the serially arranged projections are arranged in an alternating manner out of the region of the opposed edges of the contact element in a first direction toward the respective other edge.

16. A device according to claim 10, wherein the projections extend substantially perpendicular to said first direction.

17. A device according to claim 10, wherein the contact element, in the contact mounting position of the device, is disposed on the body to be contacted and on the support element with its projections in contact therewith, preferably in an alternating manner.

18. A device according to claim 10, wherein the contact element or, at least, the projections are elastically deformable such that the respective contact element or the projections thereof are, in the contact mounting position of the device, elastically resiliently biased against the body to be contacted.

19. A device according to claim 1, wherein the contact element is firmly connected with the base structure.

20. A device according to claim 1, wherein the contact element is releasably connected with the base structure.

21. A device according to claim 1, and further comprising retaining means formed on the elastic material of the base structure which extends over the contact element in a substantially form-fitting manner at at least two opposed areas of the edges on its respective side turned away from the base structure and consequently retains the contact element on the base structure.

22. A device according to claim 21, wherein the retaining means comprises at least one retaining component formed on the elastic material of the base structure extending from one edge of the contact element to an opposed edge thereof such that the retaining component extends over the contact element on its respective side turned away from the base structure and consequently retains the contact element on the base structure.

23. A device according to claim 21, wherein the retaining component forms a substantially pocket-shaped receptacle for receipt of the contact element therein.

24. A device according to claim 23, wherein the retaining component comprises a recess which forms the pocket-shaped receptacle.

25. A device according to claim 23, wherein the pockets-shaped receptacle is formed between surfaces of the retaining component and the base structure turned toward one another.

26. A device according to claim 21, wherein the retaining means is comprised of two spaced-apart retaining components which together comprise pocket-shaped receptacles turned toward one another for the receipt therein of the opposed ends of the contact element.

27. A device according to claim 26, wherein the recess in the end of the contact element is substantially complementarily formed with respect to the respective end of the contact element received therein.

28. A device according to claim 21, wherein at least one retaining component is configured as a plurality of flat strips which extend over the contact element at locations spaced from the ends thereof.

29. A device according to claim 21, wherein the retaining means comprises at least one step on which the contact element is disposed, the step being formed from the elastic material of the base structure and being remote from the respective pocket-shaped receptacle or the pocket-shaped receptacles.

30. A device according to claim 29, wherein at least two steps are provided on which the contact element is, via opposed regions of its edges, disposed.

31. A device according to claim 1, wherein the contact element is configured in an elongate shape.

32. A device according to claim 29, wherein the contact element, in the contact mounting position, is secured while in a longitudinal orientation with its ends received in the pocket-shaped receptacles.

33. A device according to claim 29, wherein the contact element is disposed on its longitudinal edge or, respectively, on one or both of its longitudinal edges, on the respective step or steps.

34. A device according to claim 1, wherein the base structure is configured as bendable.

35. A device according to claim 1, wherein the base structure is configured such that, in the contact mounting position, it encircles the body to be contacted in a ring-like or sleeve-like manner.

36. A device according to claim 1, wherein the base structure is configured as a single piece and is open in its circumferential direction and comprises, on its free ends, angled out or bent out interconnecting plates which, in the contact mounting position, are connectable to one another preferably by means of a screw fastening device or a clamping device.

37. A device according to claim 1, wherein the base structure is configured as a collar disposable in encircling relationship around the body to be contacted.

38. A device according to claim 6, wherein the support element comprises at least one passage, end preferably at least one passage on each side of the contact element, through which the elastic material extends in a manner such that the elastic material on the respective side of the support element turned toward the contact element is connected with the elastic material on the respective side of the support element turned away from the contact element.

39. A device according to claim 1, wherein the device comprises sealing means for sealing a space formed in the contact mounting position between the body to be contacted and the base structure against the penetration thereinto of air and/or moisture.

40. A device according to claim 39, wherein the sealing means comprises sealing lips formed of elastic material which are disposed on the respective side of the base structure which faces the body to be contacted in the contact mounting position and which are spaced from one another transversely to the longitudinal direction of the base structure or, respectively, in the axial direction of the base structure, the sealing lips extending along, preferably, the entire length of the base structure in its longitudinal direction or, respectively, in its circumference direction, and being disposed, in the contact mounting position of the device, in a seal effecting manner on the body to be contacted.

41. A device according to claim 39, wherein the retaining means is formed on the sealing lips.

42. A device according to claim 1, wherein the contact element is firmly connected with the elastic material of the base structure.

43. A device according to claim 1, wherein an elastic material of the base structure is sprayed onto the contact element.

44. A device according to claim 1, and further comprising interconnecting plates for securement to one another in the contacted mounting position to thereby secure the device on the body to be contacted, wherein the contact element extends to and between the interconnecting plates.

45. A device according to claim 1, wherein the device comprises sealing means for sealing a space formed in the contact mounting position between the body to be contacted and the base structure agaitnst the penetration thereinto of air and/or moisture, and the sealing means comprises sealing lips formed of elastic material, and at least one of the elastic material of the structure and the sealing lips is formed of an elastomer, especially, vulcanized rubber and/or a thermoplastic elastomer.

* * * * *